United States Patent [19]
Murrey

[11] Patent Number: 5,528,419
[45] Date of Patent: Jun. 18, 1996

[54] FLAT-FORMAT BINOCULAR KIT

[76] Inventor: Russell C. Murrey, 1955 W. Texas St., Suite 7-330, Fairfield, Calif. 94533

[21] Appl. No.: 90,748

[22] Filed: Jul. 13, 1993

[51] Int. Cl.⁶ .................................................. G02B 23/00
[52] U.S. Cl. ........................................... 359/408; 359/407
[58] Field of Search ...................... 359/408, 474, 359/409, 410, 407; 206/316.1, 316.3; 229/92.8, 103

[56] References Cited

U.S. PATENT DOCUMENTS

| | | | |
|---|---|---|---|
| 3,391,971 | 7/1968 | Kaufman | 359/474 |
| 4,066,329 | 1/1978 | Van Exel | 350/77 |
| 4,239,328 | 12/1980 | Justice et al. | 359/408 |
| 4,545,656 | 10/1985 | Takano | 350/552 |
| 4,737,747 | 9/1988 | Bresnahan | 359/408 |
| 4,913,538 | 4/1990 | Wakayama et al. | 350/546 |
| 4,913,541 | 4/1990 | Wakayama et al. | 350/546 |
| 4,964,709 | 10/1990 | Hoeptner | 359/408 |
| 4,984,879 | 1/1991 | Plunkett | 350/551 |
| 4,986,644 | 1/1991 | Yang | 350/548 |
| 5,000,556 | 3/1991 | Katsuma | 350/545 |
| 5,074,652 | 12/1991 | Addy | 359/600 |

Primary Examiner—Paul M. Dzierzynski
Assistant Examiner—Audrey Y. Chang
Attorney, Agent, or Firm—Limbach & Limbach

[57] ABSTRACT

A flat-format binocular kit from which binoculars may be constructed. The kit is intended for vending at events and performances. In the kit, a flat objective carrier in which objective lenses are mounted, and a flat eyepiece blank in which eyepiece lenses are mounted are cut from a corrugated blank. Also cut from the corrugated blank is a device that disposes the object carrier relative to the eyepiece blank to form a focusing telescope from each objective lens and the eyepiece lens. In a method of making binoculars from a flat-format kit of parts, a flat objective carrier in which objective lenses are mounted, and a precut flat eyepiece blank in which eyepiece lenses are mounted, are supplied partially cut out from a corrugated blank. The objective carrier and the eyepiece blank are extracted from the corrugated blank. Then, the object carrier is disposed relative to the eyepiece blank to form a focusing telescope from each objective lens and eyepiece lens.

31 Claims, 7 Drawing Sheets

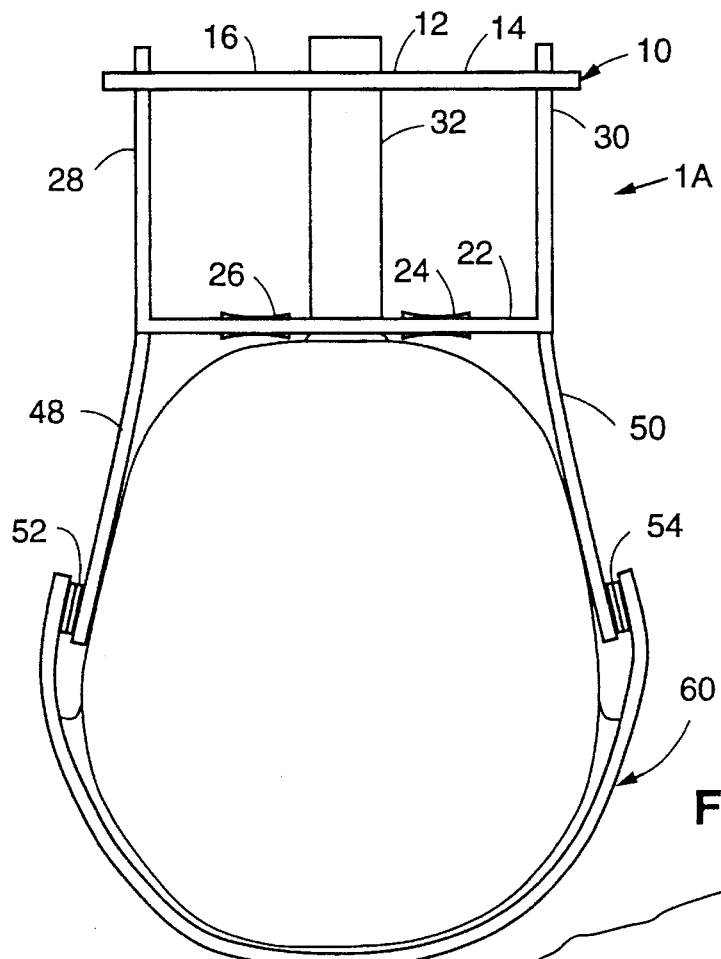
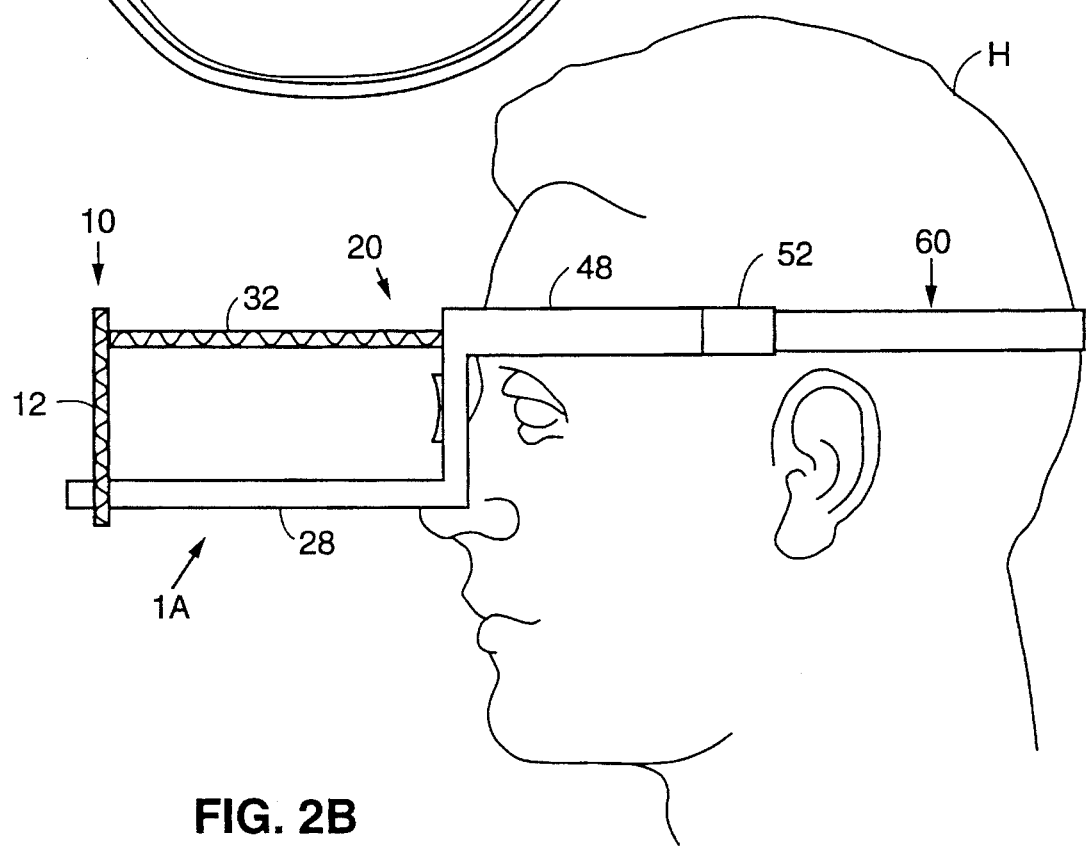
FIG. 2A
FIG. 2B

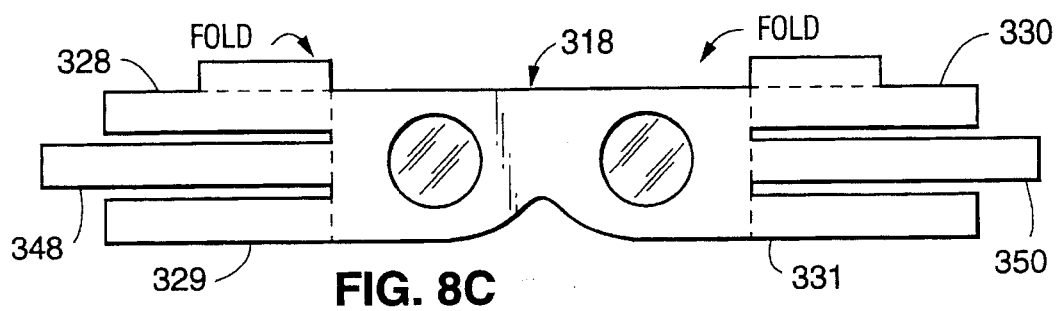
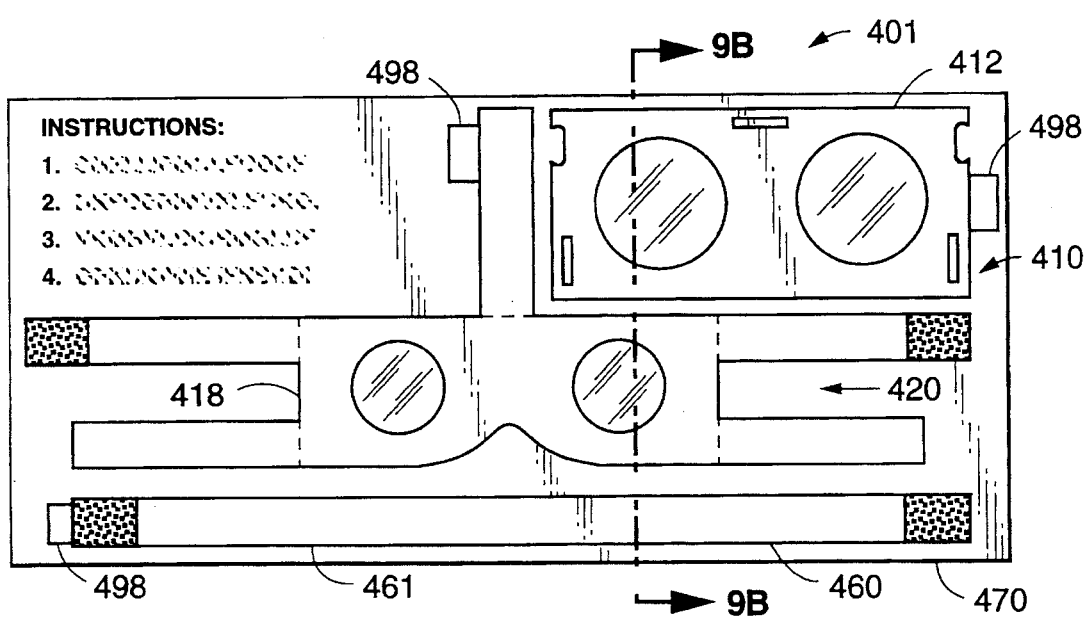
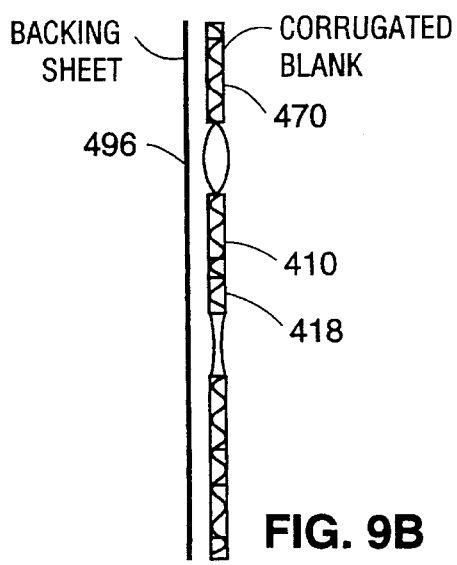

FLAT-FORMAT BINOCULAR KIT

BACKGROUND OF THE INVENTION

People attending events such as cultural, entertainment, or sporting events often find themselves located so far from the action that binoculars are required to be able to see adequately. Many people attending such events find carrying binoculars inconvenient, or simply forget to bring binoculars. Hence it is desirable that binoculars be made available for purchase or rent at such events.

Because of concerns about stock loss, hygiene, and administrative convenience, selling binoculars is preferable over renting binoculars at such events, even though the binoculars are likely to be used only once. The prior art is replete with examples of collapsible, folding, and wearable binoculars, such as those shown in U.S. Pat. Nos. 4,913,538, 4,913,541, and 4,986,644. Prior art binoculars generally include complex metal or plastic structures and therefore are unsuitable for a one-time use application. Moreover, the prior art collapsible and foldable binoculars in their collapsed states are often bulky, and have a format that makes them inconvenient for vending at an event.

The applicant is also aware of so-called paper binoculars, in which lenses in lens adapters are mounted in a complex structure formed from a piece of medium-weight card that is appropriately cut, folded, and glued. The card structure has two states, a relatively flat state for vending and carrying, and a 3-dimensional state in which the structure disposes the lenses relative to one another to provide fixed-focus binoculars.

The Galilean telescope, using a convex lens with a relatively long focal length as an objective lens, and a concave lens with a relatively short focal length as the eyepiece lens, forms the basis of most known collapsible, folding, and wearable binoculars. This arrangement requires only two optical elements to provide an erect magnified image, and is relatively compact, since the lens spacing is less than the focal length of the objective lens.

OBJECTS AND SUMMARY OF THE INVENTION

In view of the above-mentioned state of the art, it is an object of the invention to provide a flat-format binocular kit wherefrom the user can easily construct a pair of binoculars.

It is an object of the invention to provide a flat-format binocular kit that can be manufactured at minimum cost.

It is a further object of the invention to provide a flat-format binocular kit that is fully recyclable, and in which the lenses can be re-used.

It is a further object of the invention to provide a flat-format binocular kit that is robust and is convenient for vending at events.

It is a further object of the invention to provide a flat-format binocular kit from which may be constructed binoculars that are hand-held, wearable, and convertible between hand-held and wearable and vice versa.

It is a further object of the invention to provide a flat-format binocular kit that provides a large, flat surface on which advertising messages may be displayed.

Accordingly, the invention provides a binocular kit from which binoculars may be constructed. The kit comprises an objective lens, an eyepiece lens, and a corrugated blank from which are cut a flat objective carrier in which the objective lens is mounted, and a flat eyepiece blank in which the eyepiece lens is mounted. Finally, the kit includes a means for disposing the object carrier relative to the eyepiece blank to form a focusing telescope from the objective lens and the eyepiece lens.

The eyepiece blank may include an eyepiece carrier in which the eyepiece lens is mounted. The eyepiece carrier has a long side and opposed short sides. The eyepiece blank also includes an elongate top mounting that extends from the long side of the eyepiece carrier, and an elongate side mounting that extends from each short side of the eyepiece carrier. The objective carrier includes plural mounting slots. Then, when the binoculars are constructed, the means for disposing the object carrier relative to the eyepiece carrier is provided by bending the top mounting normally to the eyepiece carrier and inserting it into one of the mounting slots, and by bending each side mounting normally to the eyepiece carrier and inserting them into others of the mounting slots.

Alternatively, two elongate side mountings may extend from each short side of the eyepiece carrier. The objective carrier may include plural pairs of mounting slots. Then, when the binoculars are constructed, the means for disposing the object carrier relative to the eyepiece blank is provided by bending each pair of side mountings normally to the eyepiece carrier and inserting them into a pair of mounting slots.

To aid holding the hand-held binoculars constructed from the kit, the eyepiece carrier can include an elongate tab extending from each of its short sides, and the objective carrier can include two tab slots. When the binoculars are constructed, each elongate tab is bent normally relative to the eyepiece blank and is engaged in a tab slot to provide a bar by which the binoculars can be held.

To make the binoculars constructed from the kit wearable, the kit additionally comprises an elongate headband cut from the corrugated blank. The elongate tabs are bent in the direction opposite to that in which they are bent when the binoculars are hand held, and the headband is attached to one tab, looped around the user's head, and attached to the other tab.

The invention also provides a method of making binoculars from a flat-format kit of parts. The kit of parts comprises a corrugated blank in which are formed a precut flat objective carrier in which objective lenses are mounted, and a precut flat eyepiece blank in which eyepiece lenses are mounted. According to the method, the objective carrier and the eyepiece blank are extracted from the corrugated blank. Then, the object carrier is disposed relative to the eyepiece blank to form a focusing telescope from each objective lens and eyepiece lens.

When the eyepiece blank includes an eyepiece carrier in which the eyepiece lenses are mounted, and having a long side and opposed short sides, an elongate top mounting extending from the long side of the eyepiece carrier, and an elongate side mounting extending from each short side of the eyepiece carrier; and the objective carrier includes plural mounting slots; the objective carrier is disposed relative to the eyepiece blank by bending the top mounting and each side mounting normal to the eyepiece carrier, and inserting the top mounting and each side mounting into the mounting slots in the objective carrier.

When the eyepiece blank includes two elongate side mountings extending from each short side; and the objective carrier includes plural mounting slots; the objective carrier is disposed relative to the eyepiece blank by bending the side mountings normally relative to the eyepiece carrier, and inserting each side mounting into a mounting slot in the objective carrier.

BRIEF DESCRIPTION OF THE DRAWINGS

FIG. 2A is a plan view of wearable binoculars constructed from a first embodiment of the binocular kit according to the invention.

FIG. 2B is a side elevational view of wearable binoculars constructed from a first embodiment of the binocular kit according to the invention.

FIG. 8C shows the eyepiece blank of a fourth embodiment of the binocular kit according to the invention.

FIG. 9A shows a reusable version of the binocular kit according to the invention.

FIG. 9B shows a cross sectional view of the reusable version of the binocular kit according to the invention.

DETAILED DESCRIPTION OF THE INVENTION

Figure 1A:
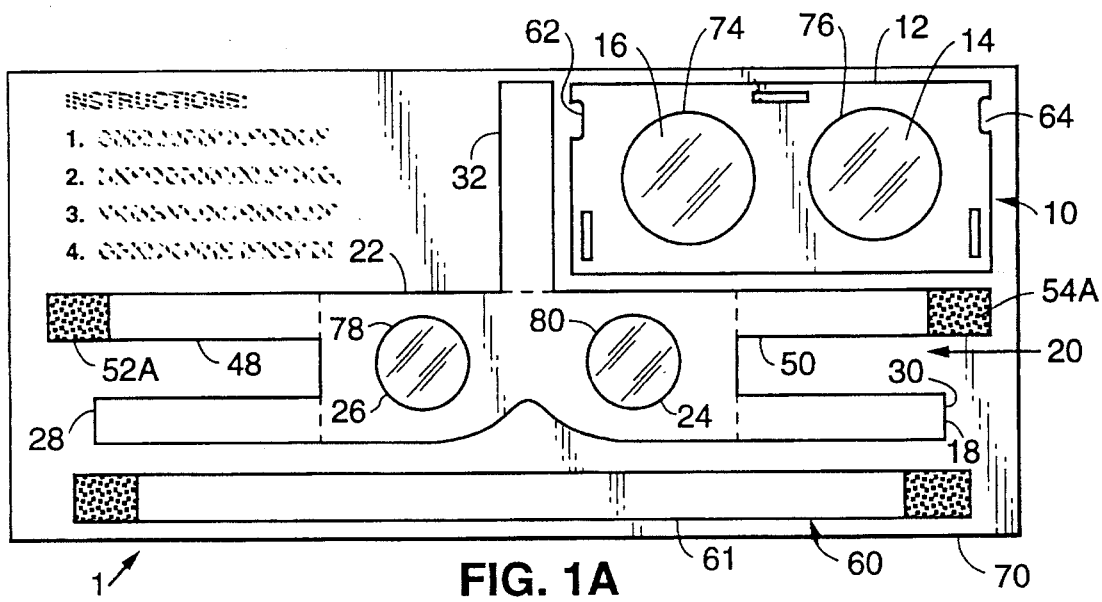
FIG. 1A is a view of a binocular kit according to the invention.
Figure 1B:
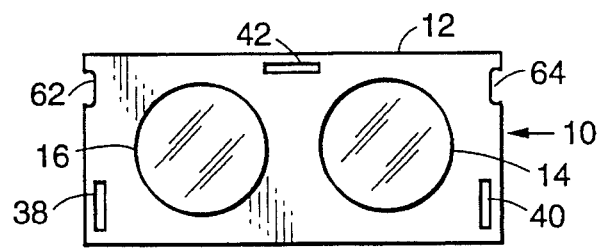
FIG. 1B shows the objective assembly of a first embodiment of the binocular kit according to the invention.
Figure 3A:
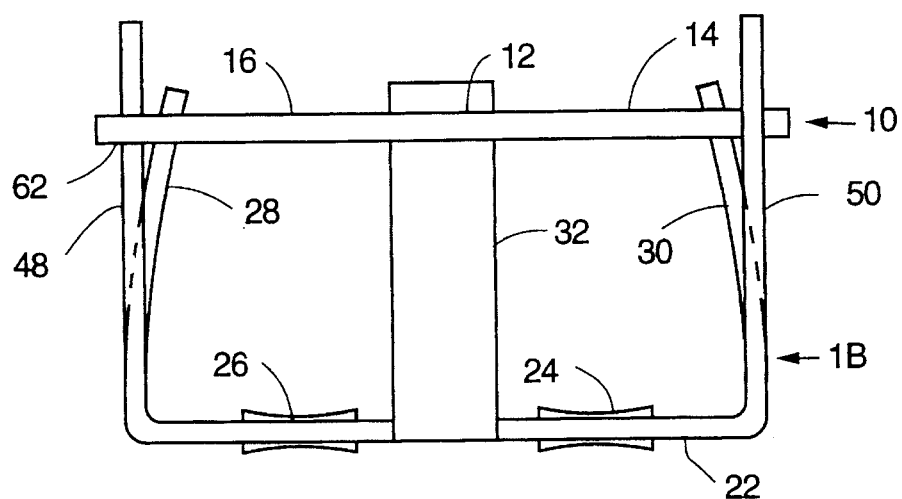
FIG. 3A is a plan view of hand-held binoculars constructed from a first embodiment of the binocular kit according to the invention.
Figure 3B:
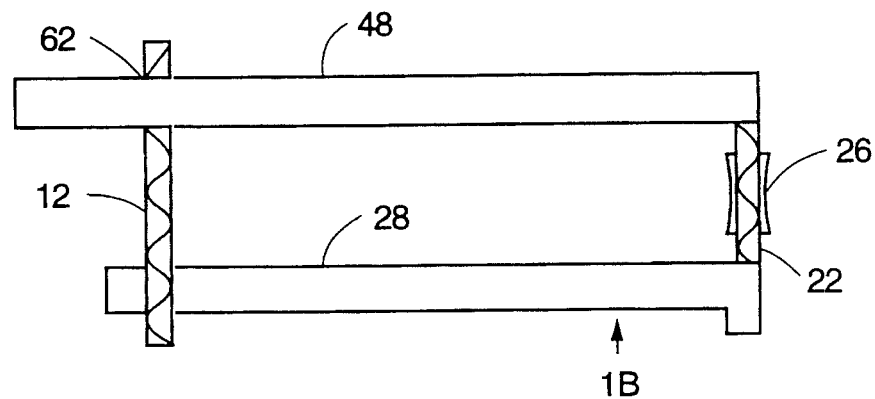
FIG. 3B is a side elevational view of hand-held binoculars constructed from a first embodiment of the binocular kit according to the invention.
Figure 3C:
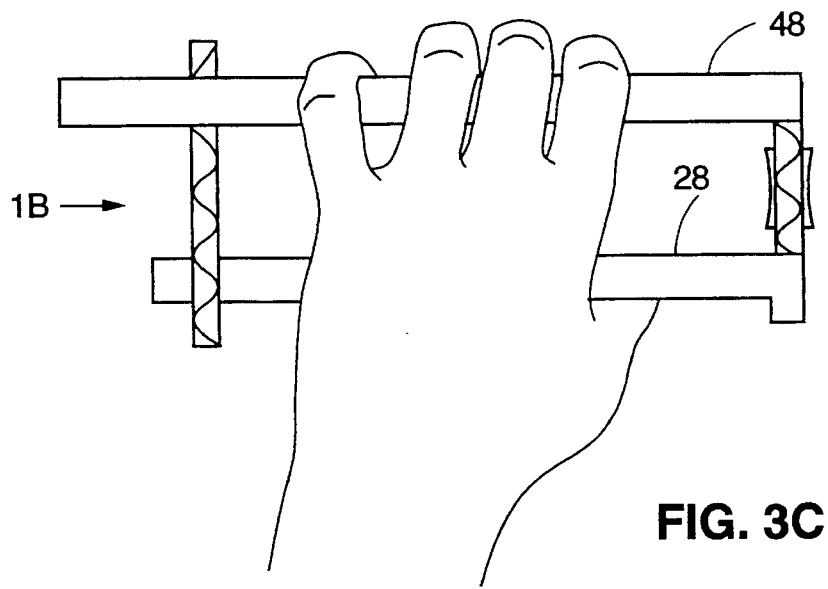
FIG. 3C is a side elevational view of hand-held binoculars constructed from a first embodiment of the binocular kit according to the invention showing how the side mountings and tabs provide convenient points by which the binoculars are held.

A first embodiment of a binocular kit according to the invention and binoculars made from the binocular kit are shown in FIGS. 1A through 3C. FIG. 1A shows the binocular kit 1 in the form in which it is supplied to the user; FIG. 1B through 1D show the three major components of the binocular kit from which the binoculars are constructed. FIGS. 2A and 2B show wearable binoculars 1A constructed from the binocular kit 1. FIG. 3A through 3C show hand-held binoculars 1B constructed from the binocular kit 1.

Referring to FIGS. 1A through 3C, the binocular kit 1 according to the invention includes the following components from which binoculars can be constructed: an objective assembly 10, which includes the objective carrier 12 and the objective lenses 14 and 16; an eyepiece assembly 20, which includes the eyepiece blank 18 and the eyepiece lenses 24 and 26; and the optional headband assembly 60.

The eyepiece blank 18 includes the eyepiece carrier 22, the side mountings 28 and 30, and the top mounting 32. The side mountings 28 and 30, and the top mounting 32 are attached to the eyepiece carrier and each is bent through approximately one right angle relative to the plane of the eyepiece carrier. The side mountings 28 and 30 engage in the side mounting slots 38 and 40 formed in the objective carrier 12, and the top mounting 32 engages in the top mounting slot 42 formed in the objective carrier.

By engaging the side mountings 28 and 30 and the top mounting 32 attached to the eyepiece carrier 22 in the side mounting slots 38 and 40, and the top mounting slot 42, respectively, in the objective carrier 12, the objective lenses 14 and 16 are mounted in front of the eyepiece lenses 24 and 26 with the optical axes of the lenses aligned to form two Galilean telescopes. The objective carrier 12 may be slid along the side and top mountings 28, 30, and 32 to adjust focus by changing the relative axial spacing of the objective and eyepiece lenses.

The eyepiece blank 18 also includes the tabs 48 and 50, which are also attached to the eyepiece carrier 22. Attached to the end of each tab remote from the eyepiece carrier is one component 52A and 54A, preferably the hook component, of the hook and loop connectors 52 and 54. The other component 52B and 54B, preferably the loop component, of each hook and loop connector 52 and 54, is attached to opposite ends of the headband blank 61 to form the headband 60. The headband may be connected to the tabs using other forms of connectors, such as suitable re-closable adhesives or adhesive tapes (using, for example, the type of adhesive used on Post-It™ notes) or various types of mechanical fastener.

FIGS. 2A and 2B show wearable binoculars 1A constructed from the binocular kit 1. The tabs 48 and 50 are each bent through approximately one right angle relative to the plane of the eyepiece carrier 22 in the direction opposite to the side mountings 28 and 30. The headband 60 loops round the back of the head H of the user and interconnects the remote ends of the tabs 48 and 50. The headband is attached to the tabs by the hook and loop connectors 52 and 54. The hook and loop connectors 52 and 54 allow the headband to be adjusted to allow the binoculars to fit comfortably a wide range of users, including children.

FIGS. 3A and 3B show hand-held binoculars 1B constructed from the binocular kit 1. In this configuration, the headband 60 is not used. The tabs 48 and 50 are each bent through approximately one right angle relative to the plane of the eyepiece carrier 22 in the same direction as the side mountings 28 and 30, and engage in the tab slots 62 and 64 in the objective carrier 12. The tabs 48 and 50, together with the side mountings 28 and 30, provide convenient points at which the hand-held binoculars constructed from the binocular kit can be held, as shown in FIG. 3C.

The binoculars constructed from the binocular kit can easily be converted from wearable binoculars to hand-held binoculars and vice versa by adding or removing the headband 60, reversing the direction of the tabs 48 and 50, and disengaging or engaging the tabs from the tab slots 62 and 64 in the objective carrier 12.

FIG. 1A shows the binocular kit 1 according to the invention in the format in which it is presented to the user, i.e., prior to conversion into binoculars. The objective carrier 12, the eyepiece blank 18, and the headband blank 61 are all formed from the single corrugated blank 70. The objective lenses 14 and 16 are inserted into the objective carrier in the corrugated blank to form the objective assembly 10. The eyepiece lenses 24 and 26 are inserted into the eyepiece blank 18 and one component 52A and 54A of the hook and loop connector 52 and 54 is attached to the eyepiece blank to form the eyepiece assembly 20. The other component 52B and 54B of the hook and loop connector 52 and 54 is attached to the headband blank 61 to form the headband 60. Thus, in the binocular kit 1, major parts of the three main assemblies, namely, the objective assembly 10, the eyepiece assembly 20, and the headband 60 form integral parts of, and are carrier by, the corrugated blank 70.

The user can construct wearable binoculars 1A, shown in FIGS. 2A and 2B, or hand-held binoculars 1B, shown in FIGS. 3A through 3C, from the binocular kit 1. The user presses the objective assembly 10, the eyepiece assembly 20, and, optionally, the headband 60, out of the corrugated blank 70; shapes the eyepiece assembly by bending the side mountings 28 and 30, the top mounting 32, and the tabs 48 and 50 relative to the eyepiece carrier 22; attaches the objective assembly 10 to the side and top mountings, and either attaches the headband 60 to the tabs 48 and 50 or attaches the tabs to the tab slots 62 and 64 in the objective carrier. The assembly method will be described in more detail below.

Corrugated cardboard about 4 mm thick is the preferred material for the corrugated blank 70. Corrugated cardboard is preferred because recycling channels are better established for such material. Alternatively, a corrugated plastic material, or a non-corrugated material, can be used for the corrugated blank.

A corrugated material, consisting of a corrugated layer bonded between two plane layers, is preferred for the corrugated blank 70 because a corrugated material combines high strength and light weight. Moreover, corrugated material is relatively thick, which allows the eyepiece lenses and the objective lenses to be mounted directly in the eyepiece carrier and the objective carrier without the need for lens mounting components.

Figure 4:
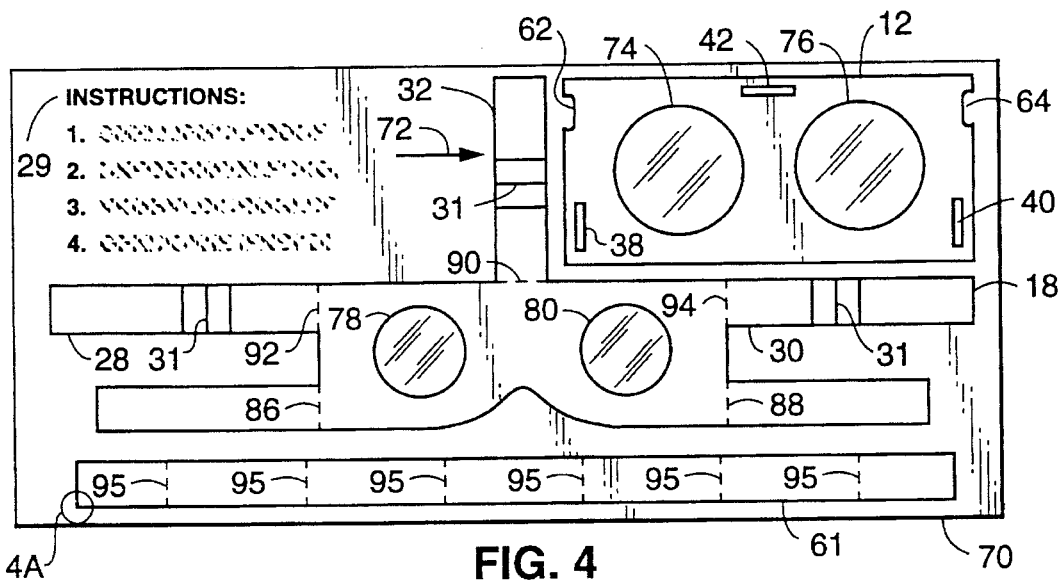
FIG. 4 shows the objective carrier, the eyepiece blank, and the headband blank formed in the corrugated blank of a first embodiment of the binocular kit according to the invention.
Figure 4A:
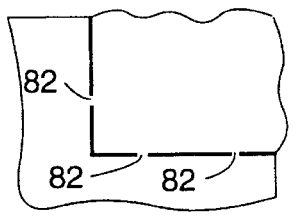
Figure 5:
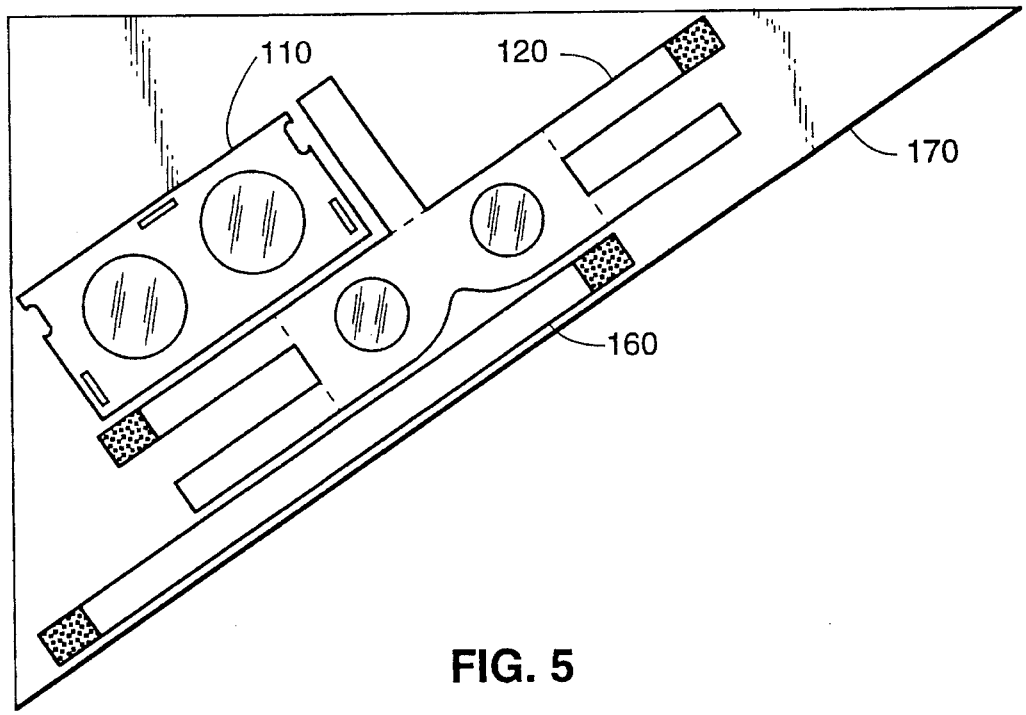
FIG. 5 shows an embodiment of the binocular kit according to the invention with a pennant-shaped corrugated blank.

The corrugated blank 70 is preferably rectangular, about 430 mm by about 100 mm, as shown in FIG. 4. The corrugations are oriented in the direction shown by the arrow 72 to provide optimum strength to the components of the binoculars. The shape of the corrugated blank can have many variations, the only restrictions being that the main components be accommodated within the bounds of the corrugated blank, and that the corrugations be oriented relative to the main components substantially in the direction shown by the arrow 72. For example, binoculars for use at ball games could use a triangular corrugated blank 170 in the form of a team pennant, as shown in FIG. 5.

Bulk corrugated material is suitably printed prior to forming the corrugated blanks from it. Preferably, the parts of the material that will eventually form opposing internal faces in the assembled binoculars are printed with a dark, matte colour to reduce the formation of spurious images of the objective and the eyepiece carriers. Assembly and recycling instructions 29 are also printed on each corrugated blank. Also, alignment marks 31 are preferably printed on the side mountings 28 and 30, and the top mounting 32. The alignment marks can include marks indicating where the objective assembly 10 should be located along the length of the mountings for a distant object to be in focus. The alignment marks can also include marks to aid setting the objective carrier 12 parallel to the eyepiece carrier 22.

Finally, each corrugated blank 70 includes a large area on which promotional messages may be displayed. Messages may be general advertising messages, or messages specific to the event at which the binocular kits are sold. Printed advertisements may be enhanced by flashing lights and/or speech and/or music synthesizers or reproducers built into parts of the corrugated blank 70 not occupied by binocular components. Using the corrugated blank to carry advertising enables the selling price of the binoculars to be reduced.

The corrugated blank 70 is cut from the bulk corrugated material and the objective carrier 12, the eyepiece blank 18, and the headband blank 61 are formed in the corrugated blank, preferably by die cutting, as shown in FIG. 4. In the die cutting process, the objective lens apertures 74 and 76, and the eyepiece lens apertures 78 and 80 are cut out entirely to allow the objective and eyepiece lenses to be mounted in the objective carrier 12 and in the eyepiece carrier 22, respectively.

Also cut out entirely by the die cutting process are the side mounting slots 38 and 40, and the top mounting slot 42 in the objective carrier 12. The width of the side mounting slots and the top mounting slots is the same as, or slightly greater than, the width of the side mountings 28 and 30, and of the top mounting 32, respectively. The height of the side mounting slots and of the top mounting slot is slightly less than the thickness of the corrugated material. The reduced height of the mounting slots provides fiction when the side and top mountings are inserted into the side and top mounting slots respectively. The mounting and slot arrangement allows the objective carrier 12 to be slid axially relative to the eyepiece carrier 22 during assembly and during focus adjustment. The friction between the mountings and their respective slots maintains the objective carrier 12 in its set position after adjustment.

Figure 6A:
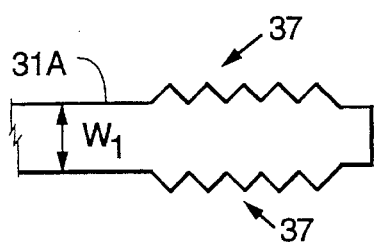
FIG. 6A shows a serrated form of the side mounting in the binocular kit according to the invention.
Figure 6B:
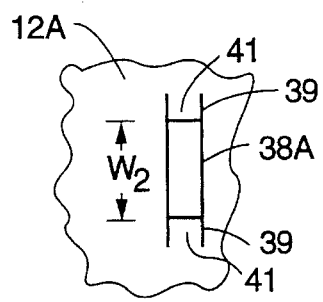
FIG. 6B shows a modified side member slot for use with the serrated form of the side mounting in the binocular kit according to the invention.

The stability of the objective carrier on the side and top mountings may be further enhanced by providing serrations 37 along at least part of the edges of the side mountings. An example of a serrated side mounting 31A is shown in FIG. 6A. The corresponding side mounting slot 38A in the objective carrier 12A is shown in FIG. 6B. The width $w_2$ of the cut-out part of the side mounting slot is about the same as the width $w_2$ of the side mounting. Additional longitudinal cuts 39 are made to leave opposed flaps 41 that engage in the serrations 37. The flaps 41 engaging in the serrations 37 lock the objective carrier in place on the side mountings. An arrangement of serrations 37 disposed on opposite edges of the side mounting and opposed flaps 41 is shown; alternatively, serrations disposed along only one edge of the side mounting and a single flap can be used. Serrations can additionally or alternatively be used to lock the objective carrier in position on the top mounting.

Referring once more to FIG. 4, the outlines of the objective carrier 12, the eyepiece blank 18, and the headband blank 61 are defined by die cutting entirely through the corrugated layer and one plane layer of the corrugated blank 70. The outlines of these components are not fully defined in the other plane layer, and the components remain attached to the corrugated blank by small connecting pieces of the other plane layer, such as the connecting piece 82 shown in the inset portion of FIG. 4. The connecting pieces maintain the components as integral parts of the corrugated blank until the user is ready to construct binoculars from the binocular kit.

Figure 6C:
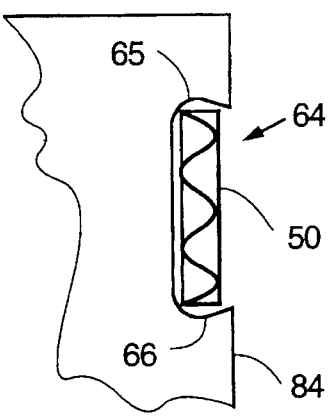
FIG. 6C shows details of the tab slot in the objective carrier of the binocular kit according to the invention.

Die cutting the outline of the objective carrier 12 also forms the tab slots 62 and 64. One of the tab slots, for example, the tab slot 64, is shown in detail in FIG. 6C. The sides 65 and 66 of the tab slot 64 engaging with the edges of the tab 50 are profiled as shown so that the width of the tab slot increases towards the center of the objective carrier. The width of the tab slot 64 at the edge 84 of the objective carrier is narrower than the width of the tab 50. This tab slot profile locks the tab in place after the tab has been inserted into the tab slot.

Referring once more to FIG. 4, the die cutting process also crushes the corrugated material forming the eyepiece blank 18 at the points where the side mountings 28 and 30, the top mounting 32, and the tabs 48 and 50 join the eyepiece carrier 22, i.e., along the lines 86, 88, 90, 92, and 94. A blunt tool is used for this process to avoid cutting the corrugated material. Crushing the corrugated material in this way defines the lines along which the mountings and tabs will bend cleanly during construction of binoculars from the binocular kit.

The corrugated material forming the headband blank 61 is also crushed in several places along its length, such as along the lines 95. Crushing the headband blank 61 as shown enables the headband 60 to conform more easily to the contours of the user's head.

Referring now to FIG. 1A, the objective lenses 14 and 16 and the eyepiece lenses 24 and 26 are mounted in the lens apertures 74, 76, 78, and 80 in the corrugated blank 70. The objective lenses are convex lenses having a thickness that decreases towards the edge of the lens. By forming the lens apertures 74 and 76 with a diameter slightly smaller than the diameter of the objective lenses, the objective lenses can be pressed into the lens apertures 74 and 76 in the objective carrier 12 where they are retained in position by the corrugated layer of the objective carrier. A small amount of a suitable adhesive insures against the objective lenses being popped out accidentally.

The eyepiece lenses 24 and 26 are concave lenses having a thickness that increases towards the edge of the lens. By forming the lens apertures 78 and 80 with a diameter slightly smaller than the diameter of the lens, and forming a groove in the edge of the lens, the eyepiece lenses can be pressed into the eyepiece lens apertures 78 and 80 in the eyepiece carrier 22, where they are retained in position by the edge of the lens aperture engaging in the groove in the edge of the lens. A small amount of a suitable adhesive insures against the eyepiece lenses being popped out accidentally.

Different combinations of focal lengths and diameters for the objective and eyepiece lenses can be used to provide optimum compromises between magnification, image brightness, field of view, and cost, for various applications. Compound lenses can be used to reduce lens aberrations if such lenses can be afforded, or a large proportion of recycled lenses can be used.

It is preferable to use relatively large diameter lenses to accommodate a wide range of inter-ocular distances since the distance between the centers of the eyepiece lenses is not adjustable. In the preferred embodiment, 40 mm diameter eyepiece lenses and 50 mm diameter objective lenses are preferably used. In the preferred embodiment, the objective lenses have a power of +6.25 dioptres, and the eyepiece lenses have a power of −11.50 dioptres.

The hook components 52A and 54A of the hook and loop connectors 52 and 54 are attached close to the ends of the tabs 48 and 50 remote from the eyepiece carrier 22 in the eyepiece blank 18. The loop components 52B and 54B are attached close to the ends of the headband blank 61.

Finally, the binocular kit is placed in an envelope (not shown), preferably a transparent envelope, to protect the lenses during shipping and vending. After use, the components of the binocular kit can be returned to the envelope for recycling. The envelope once again protects the lenses during recycling. Alternatively, the binocular kit can be shrink wrapped. The packaged binocular kit 1 is little thicker than the corrugated blank 70. The binocular kit occupies considerably less volume and is more robust than equivalent power conventional folding binoculars, and so the kit can be conveniently vended at entertainment venues.

Wearable binoculars are constructed from the binocular kit by the following method. The shrink wrap is first removed from the binocular kit. The three main binocular components, namely, the objective assembly 10, the eyepiece assembly 20, and the headband 60, are extracted from the corrugated blank 70. This process breaks the connecting pieces, such as the connecting pieces 82, between the objective carrier 12, the eyepiece blank 18, and the headband blank and the corrugated blank 70, enabling the main components to be removed from the corrugated blank.

The eyepiece assembly 20 is then given a three-dimensional form by bending the side mountings 28 and 30, the top mounting 32, and the tabs 48 and 50 until the mountings and tabs are normal to the eyepiece carrier 22. Because the eyepiece blank 18 is crushed along the lines 86, 88, 90, 92, and 94, the mountings and the tabs bend cleanly relatively to the eyepiece carrier. The tabs 48 and 50 are bent in the opposite direction to the mountings 28, 30 and 32.

The objective assembly 10 is then attached to the eyepiece assembly 20 by inserting the top mounting 32 into the top mounting slot 42 in the objective carrier 12, and inserting the side mountings 28 and 30 into the side mounting slots 38 and 40. The spacing between the objective carrier and the eyepiece carrier is adjusted to bring the object being viewed into focus and to make the objective carrier parallel to the eyepiece carrier in both the vertical plane and the horizontal plane.

One end of the headband 60 is attached to the tab 48 by mating the hook and loop connector 52. The binoculars are placed on the user's nose with the eyepiece lenses aligned with the user's eyes. An optimum field of view is obtained when the eyepiece lenses are located as close to the eye as possible. The position of the binoculars is adjusted to the user's preference, then the headband 60 is passed round the back of the user's head, and the other end of the headband is attached to the tab 50 by mating the hook and loop connector 54. Because the headband blank 61 is crashed along the lines 95, the headband 60 fits comfortably in a smooth curve around the back of the user's head.

Further positional adjustments of the binoculars can be achieved by temporarily disconnecting either of the tabs 48 and 50 from the headband 60 by opening one of the hook and loop connectors 52 and 54, making the adjustment, and reconnecting the headband and the tab. The hook and loop connectors can be attached in various offset positions to allow the headband to provide a perfect fit for all sizes of heads.

Hand-held binoculars are constructed from the binocular kit by the following method. The shrink wrap is first removed from the binocular kit. The two main binocular components, namely, the objective assembly 10, and the eyepiece assembly 20, are pressed out of the corrugated blank 70. This process breaks the connecting pieces, such as the connecting pieces 82, between the objective carrier 12 and the eyepiece blank 18 and the corrugated blank 70, enabling the main components to be removed from the corrugated blank. When hand-held binoculars are constructed from the kit, there is no need to remove the headband 60 from the corrugated blank.

The eyepiece assembly 20 is then given a three-dimensional form by bending the side mountings 28 and 30, the top mounting 32, and the tabs 48 and 50 until the side mountings and tabs are roughly normal to the eyepiece carrier 22. Because the eyepiece blank 18 is crushed along the lines 86, 88, 90, 92, and 94, the mountings and the tabs bend cleanly relatively to the eyepiece carrier. The tabs 48 and 50 are bent in the same direction as the mountings 28, 30 and 32.

The objective assembly 10 is then attached to the eyepiece assembly 20 by inserting the top mounting 32 into the top mounting slot 42 in the objective carrier 12, and inserting the side mountings 28 and 30 into the side mounting slots 38 and 40. The tabs 48 and 50 are also inserted into the tab slots 62 and 64 in the objective carrier.

The spacing between the objective carrier and the eyepiece carrier is adjusted to bring the object being viewed into focus and to make the objective carrier 12 parallel to the eyepiece carrier 22 in both the vertical plane and the horizontal plane. During use, the user can conveniently hold the binoculars by applying gentle pressure between the edges of the tabs 48 and 50 and the edges of the respective side mountings 28 and 30 using the thumb and fingers, as shown in FIG. 3C.

After use, the binoculars and the remains of the corrugated blank can simply be disposed of in recycling bins. The lenses and hook-and-loop connectors can be removed from the used binoculars, and the corrugated material can be recycled through normal channels for recycling such materials. The lenses can be tested for scratches and other defects, and optically-acceptable lenses can be cleaned and re-used.

Users wishing to re-use the binoculars can remove the objective assembly from the eyepiece assembly, and, if appropriate, the headband from the eyepiece assembly. The user may reinsert the components into the corrugated blank 70 if desired.

Figure 7A:
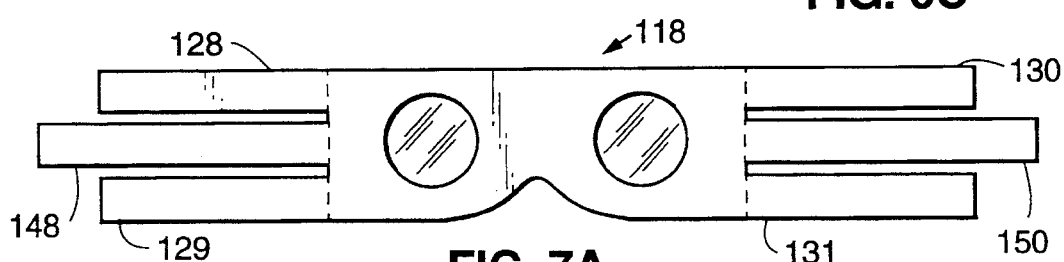
FIG. 7A shows the eyepiece blank of a second embodiment of the binocular kit according to the invention.
Figure 7B:
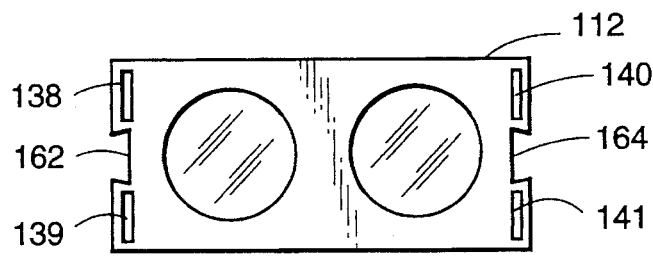
FIG. 7B shows the objective carrier of a second embodiment of the binocular kit according to the invention.

FIGS. 7A and 7B, respectively, show an alternative configuration of the eyepiece blank 118 and the objective carrier 112 in which the overall height of the eyepiece blank is reduced. The eyepiece blank, shown in FIG. 7A, lacks a top mounting similar to the top mounting 32 shown in FIG 1B. The objective carrier, shown in FIG. 7B, lacks a top mounting slot corresponding to the top mounting slot 42 shown in FIG. 1C. Instead, each side of the eyepiece blank 118 includes two side mountings 128, 129, 130, and 131; and each side of the objective carrier includes two side mounting slots 138, 139, 140, and 141 that engage with the side mountings.

The tab 148 is attached to the eyepiece blank 118 between the two side mountings 128 and 129, and the tab 150 is attached the eyepiece blank between the two side mountings 130 and 131. The position of the tab slots 162 and 164 in the objective carrier 112 is changed to correspond to the repositioned tabs 148 and 150.

Figure 8A:
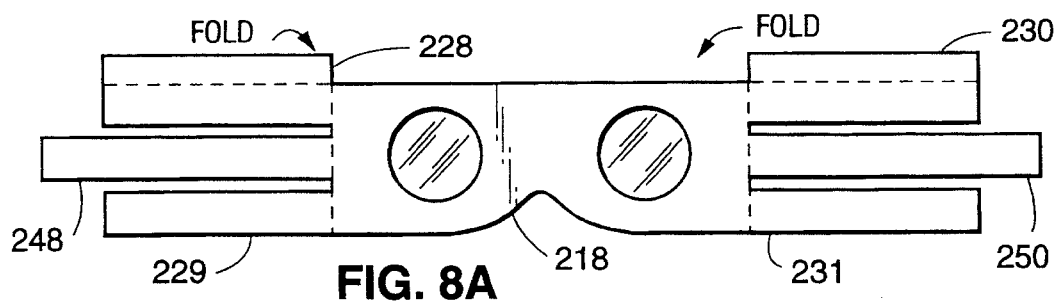
FIG. 8A shows the eyepiece blank of a third embodiment of the binocular kit according to the invention.
Figure 8B:
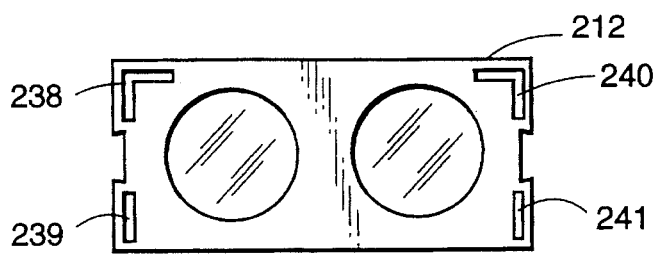
FIG. 8B shows the objective carrier of a third embodiment of the binocular kit according to the invention.

With this arrangement, the lateral stability of the mounting of the objective carrier, and hence of the objective lenses, is reduced compared with the arrangement shown in FIGS. 1A through 1D. Much of the lost lateral stability can be restored by widening at least two of the side mountings, for example, the side mountings 228 and 230, as shown in FIG. 8A. The widened side mountings are then folded lengthwise as shown. The widened side mountings engage in the L-shaped side mounting slots 238 and 240 in the objective carrier 212 shown in FIG. 8B.

Alternatively, the side mountings 328 and 330 can be widened and folded over part of their length, as shown in FIG. 8C. The side mountings 328 and 330 can engage in the side mounting slots 138 and 140 in the objective carrier 112 shown in FIG. 7B.

A reusable version of the binocular kit described above is shown in FIGS. 9A and 9B.

The main components of the reusable binocular kit 401, namely, the objective assembly 410, the eyepiece assembly 418, the headband 460, and the corrugated blank 470 are similar to those of the binocular kit described above. The components of the reusable binocular kit differ as follows. The corrugated blank 470 is attached to the backing sheet 496, as shown in FIG. 9B. The backing sheet is preferably a piece of paperboard with the same width and length as the corrugated blank.

In the process of die cutting the outfines of the objective carrier 412, the eyepiece blank 418, and the headband blank 461 in the corrugated blank 470, all the layers of the corrugated material are cut through, but the backing sheet 496 is not cut. Pull tabs 498 are attached to each of the main binocular components, namely, the objective assembly 410, the eyepiece assembly 420 and the headband 460.

The method of constructing binoculars from the reusable version of the binocular kit is similar to that for constructing binoculars from the single-use versions of the binocular kit. However, the user does not have to press the components out of the corrugated blank, but simply extracts the components from the corrugated blank by pulling on each of the pull tabs 498.

After using the binoculars, the user can dismantle the binoculars and insert the main binocular components into their respective places in the corrugated blank. Friction between the edges of the corrugated blank and the components retains the main components in the corrugated blank until they are removed the next time the binoculars are assembled for use. Alternatively, the main binocular components may be positively retained in the corrugated blank by attaching one component of a suitable connector, such as a hook and loop connector, to each main component and attaching the other component of the connector to the backing sheet. The location of the other component on the backing sheet is chosen so that the connector mates when the main component is inserted into its location in the corrugated blank.

In the simple Galilean telescope, the field of view is inversely proportional to the magnification. Accordingly, if binoculars with a single magnification are sold at an event, patrons seated towards the rear may have an excessive field of view and insufficient magnification, while patrons seated further forward may have too narrow a field of view and excessive magnification. This problem can be solved by the multi-power binocular kit according to the invention, the eyepiece blank and the interchangable eyepiece carriers of which are shown in FIG. 10.

Figure 10A:
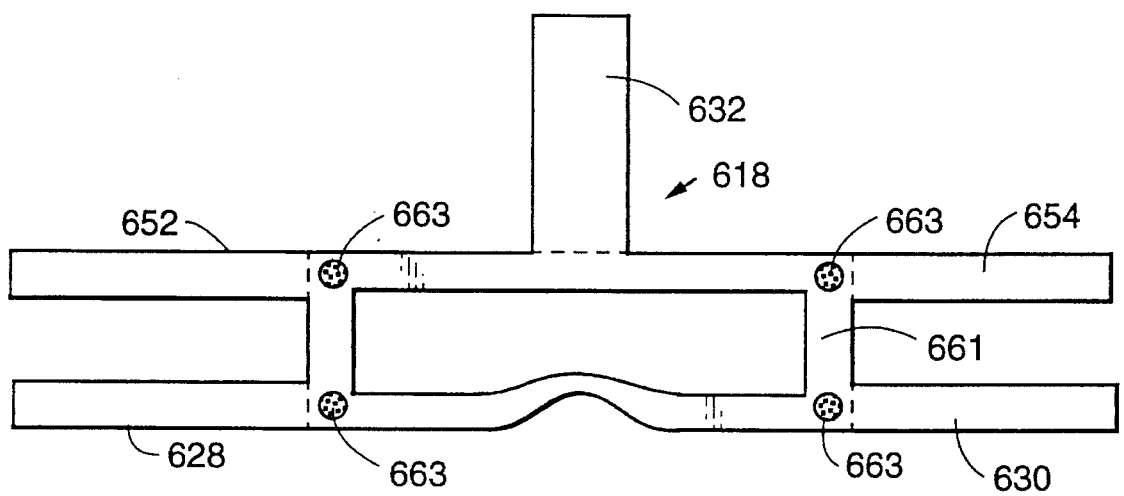
FIG. 10 shows the eyepiece blank and two interchangable eyepiece carriers of a fifth embodiment of the binocular kit according to the invention from which binoculars of different powers can be made.
Figure 10B:
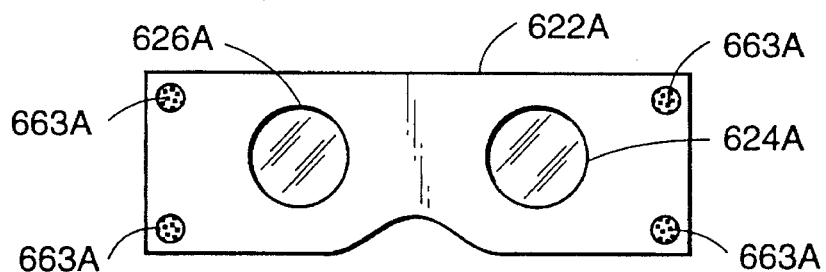
Figure 10C:
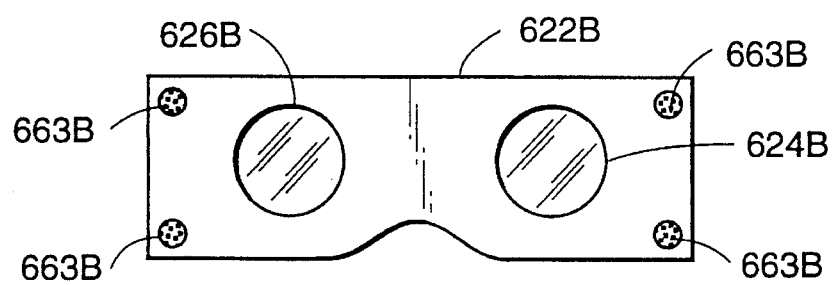

In the multi-power binocular kit shown in FIG. 10, one of the two or more interchangable eyepiece carriers 620A and 620B can be attached to the eyepiece blank 618. Each eyepiece carrier is fitted with eyepiece lenses 624A, 626A; and 624B, 626B having a different focal length. The user can therefore select the eyepiece carrier having eyepiece lenses that produce an optimum magnification and field of view for the user's location.

Figure 1C:
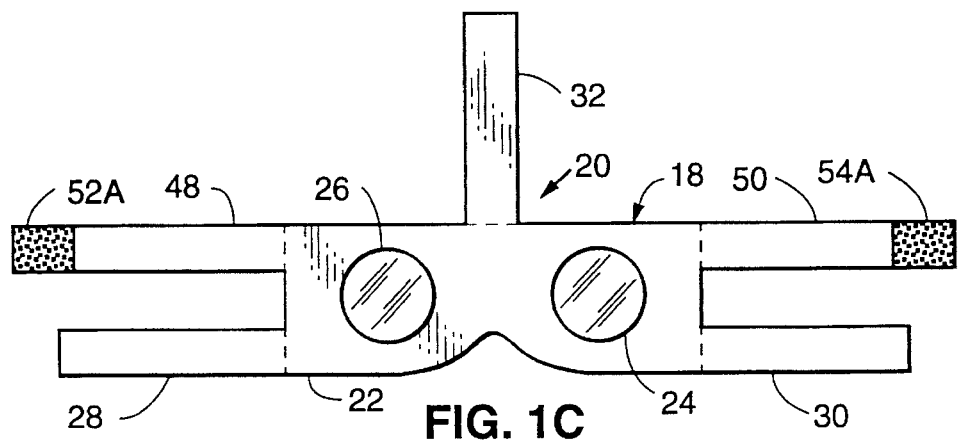
FIG. 1C shows the eyepiece assembly of a first embodiment of the binocular kit according to the invention.
Figure 1D:
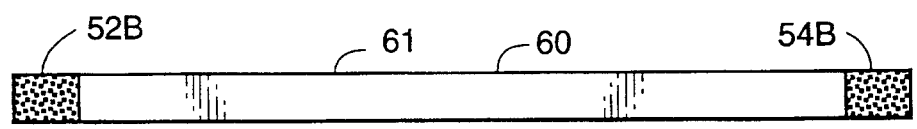
FIG. 1D shows the headband of the binocular kit according to the invention.

In FIG. 10, the eyepiece blank 618 is similar to the eyepiece blank 18 shown in FIG. 1C, and includes the side mountings 628 and 630, the top mounting 632, and the tabs 654 and 654. Alternatively, the eyepiece blank can have a configuration corresponding to that shown in FIG. 7A or FIG. 8A. The center of the eyepiece blank is cut away to provide the aperture 661. One component 663 of a hook and loop connector is attached to the eyepiece blank at several points as shown.

The interchangable eyepiece carriers 620A and 620B are pieces of the corrugated blank, shaped as shown, and have mounted in them eyepiece lenses 624A and 626A, and 624B and 626B, respectively, having different focal lengths. The ratio between the focal length of the eyepiece lenses 624A and 626A, and that of the eyepiece lenses 624B and 626B is in the range of, for example, 1.141 to 2. Attached to each eyepiece carrier in several places is the other component 663A and 663B of a hook and loop connector. Other types of connectors, such as adhesive connectors could alternatively be used.

The objective assembly and the headband of the multi-power binocular kit are the same as those described above with respect to FIG. 1A, and so will not be further described. The method of assembling the multi-power binocular kit is the same as that described above with respect to the single power versions of the binocular kit except that, after the objective assembly has been attached to the eyepiece blank, a selected one of the eyepiece carriers 620A or 620B is attached to the eyepiece blank 618 by mating the components of the hook and loop connectors. Alternatively, the user may attach the selected eyepiece carrier to the eyepiece blank before assembling the binocular kit.

If, later, the user wishes to change the magnification and field of view of the binoculars, the user can simply remove the selected eyepiece carrier from the eyepiece blank by separating the components of the hook and loop connectors. The user can then return the selected eyepiece carrier to the corrugated blank, and attach the other eyepiece carrier to the eyepiece blank.

Although illustrative embodiments of the invention have been described herein in detail, it is to be understood that the invention is not limited to the precise embodiments described, and that various modifications may be practiced within the scope of the invention defined by the appended claims.

I claim:

1. A flat-format binocular kit providing parts wherefrom wearable binoculars are constructed, the binocular kit comprising:

a corrugated blank, including a corrugated layer sandwiched between two outer layers, there being cut from the corrugated layer:
a flat objective carrier having an objective aperture formed therein,
a separate eyepiece blank including:
an eyepiece carrier wherein an eyepiece aperture is formed, the eyepiece carrier having opposed short sides; and
an elongate tab extending from each of the short sides of the eyepiece carrier, the elongate tabs each being bent generally perpendicularly relative to the eyepiece carrier when the binoculars are constructed, an elongate head band, and
means for disposing the objective carrier at a distance from, and substantially parallel to, the eyepiece blank;
means for attaching opposite ends of the head band to the elongate tabs;
an objective lens having a periphery, the objective lens being mounted in the objective aperture in the objective carrier with the periphery of the objective lens in contact with the corrugated layer; and
an eyepiece lens having a periphery, the eyepiece lens being mounted in the eyepiece aperture in the eyepiece carrier with the periphery of the eyepiece lens facing the corrugated layer,
the means for disposing the objective carrier at a distance from, and substantially parallel to, the eyepiece blank disposing the objective carrier at a settable distance from the eyepiece blank to form a focusable telescope from the objective lens and the eyepiece lens.

2. The binocular kit of claim 1, wherein:
the eyepiece carrier additionally has a long side;
the eyepiece blank additionally includes:
an elongate top mounting extending from the long side of the eyepiece carrier, and
an elongate side mounting extending from each of the short sides of the eyepiece carrier;
the objective carrier additionally has a top mounting slot and plural side mounting slots formed therein; and
the means for disposing the objective carrier relative to the eyepiece blank includes:
the top mounting and the top mounting slot, the top mounting being bent generally perpendicularly to the eyepiece carrier and being inserted into the top mounting slot when the binoculars are constructed, the top mounting slot being substantially coplanar with the objective lens, and
the side mountings and the side mounting slots, the side mountings being bent generally perpendicularly to the eyepiece carrier and being inserted into respective ones of the side mounting slots when the binoculars are constructed, and the side mounting slots being substantially coplanar with the objective lens.

3. The binocular kit of claim 2, wherein the top mounting is slidably inserted in the top mounting slot, and each of the side mountings is slidably inserted in the respective ones of the side mounting slots to allow the objective carrier to be moved axially relative to the eyepiece carrier to adjust focus.

4. The binocular kit of claim 2, wherein:
the objective carrier additionally has two tab slots formed therein; and
each elongate tab is disconnected from the head band, is bent through about two right angles, and is inserted in a respective one of the tab slots to convert the binoculars constructed from the kit from wearable to hand-held.

5. The binocular kit of claim 1, wherein:
the objective carrier additionally includes two tab slots formed therein; and
each elongate tab is disconnected from the head band, is bent through about two right angles towards the objective carrier, and is inserted into a respective one of the tab slots to convert the binoculars constructed from the kit from wearable to hand-held.

6. The binocular kit of claim 1, wherein:

the eyepiece blank additionally includes a pair of elongate side mountings extending from each of the short sides of the eyepiece carrier;

the objective carrier additionally has plural side mounting slots formed therein; and the means for disposing the objective carrier relative to the eyepiece blank includes the side mountings and the side mounting slots, the side mountings being bent generally perpendicularly to the eyepiece carrier and inserted into the side mounting slots when the binoculars are constructed, the side mounting slots being substantially coplanar with the objective lens.

7. The binocular kit of claims 6, wherein each elongate tab is disconnected from the head band, is bent through about two right angles toward the objective carrier, and is inserted into a respective one of the tab slots to convert the binoculars constructed from the kit from wearable to hand-held, the tab slots being substantially coplanar with the objective lens.

8. A flat-format binocular kit providing parts wherefrom binoculars are constructed, the binoculars constructed from the kit being dismantlable back to the substantially flat-format kit for storage, the kit comprising:

a corrugated blank, including a corrugated layer sandwiched between two outer layers, there being cut from the corrugated layer:

a flat objective carrier having an objective aperture formed therein, a separate eyepiece blank having an eyepiece aperture formed therein, and means for disposing the objective carrier at a distance from, and substantially parallel to, the eyepiece blank;

a backing sheet whereon the corrugated blank is attached, the backing sheet bounding cavities in the corrugated blank into which the objective carrier and the eyepiece blank can be replaced when the binoculars are dismantled;

means, attached to the objective carrier, for extracting the objective carrier and the eyepiece blank from the corrugated blank and the backing sheet;

an objective lens having a periphery, the objective lens being mounted in the objective aperture in the objective carrier with the periphery of the of the objective lens in contact with the corrugated layer; and an eyepiece lens having a periphery, the eyepiece lens being mounted in the eyepiece aperture in the eyepiece blank with the periphery of the eyepiece lens facing the corrugated layer, the means for disposing the objective carrier at a distance from, and substantially parallel to, the eyepiece blank disposing the objective carrier at a settable distance from the eyepiece blank to form a focusable telescope from the objective lens and the eyepiece lens.

9. The binocular kit of claim 8, wherein:

the eyepiece blank includes:

an eyepiece carrier wherein the eyepiece aperture is formed, the eyepiece carrier having a long side and opposed short sides, an elongate top mounting extending from the long side of the eyepiece carrier, and an elongate side mounting extending from each of the short sides of the eyepiece carrier;

the objective carrier additionally has a top mounting slot and plural side mounting slots formed therein; and the means for disposing the objective carrier relative to the eyepiece blank includes:

the top mounting and the top mounting slot, the top mounting being bent generally perpendicularly to the eyepiece carrier and being inserted into the top slot when the binoculars are constructed, the top mounting slot being substantially coplanar with the objective lens, and the side mountings and the side mounting slots, the side mountings being bent generally perpendicularly to the eyepiece carrier and being inserted into respective ones of the side mounting slots when the binoculars are constructed, the side mounting slots being substantially coplanar with the objective lens.

10. The binocular kit of claim 9, wherein:

the eyepiece blank additionally includes an elongate tab extending from each of the short sides of the eyepiece carrier;

the objective carrier additionally has two tab slots formed therein; and each elongate tab, bent generally perpendicularly relative to the eyepiece carrier when the binoculars are constructed, is inserted into a respective one of the tab slots, the tab slots being substantially coplanar with the objective lens.

11. The binocular kit of claim 8, wherein:

the eyepiece blank includes:

an eyepiece carrier wherein the eyepiece aperture is formed, the eyepiece carrier having opposed short sides, and an elongate tab extending from each of the short sides of the eyepiece carrier;

the objective carrier additionally has two tab slots formed therein; and each elongate tab, bent generally perpendicularly relative to the eyepiece carrier when the binoculars are constructed, is inserted into a respective one of the tab slots, the tab slots being substantially coplanar with the objective lens.

12. The binocular kit of claim 11, wherein:

each elongate tab is disengaged from the respective one of the tab slots and is bent through about two right angles away from the objective carrier to convert the binoculars constructed from the kit from hand-held to wearable; and the binocular kit additionally comprises:

an elongate head band cut from the corrugated blank, and means for attaching opposite ends of the head band to the elongate tabs.

13. The binocular kit of claim 8, wherein:

the eyepiece blank includes:

an eyepiece carrier wherein the eyepiece aperture is formed, the eyepiece carrier having opposed short sides, a pair of elongate side mountings extending from each of the short sides of the eyepiece carrier;

the objective carrier additionally has plural side mounting slots formed therein; and the means for disposing the objective carrier relative to the eyepiece blank includes the side mountings and the side mounting slots, the side mountings being bent generally perpendicularly to the eyepiece carrier and being inserted into the side mounting slots when the binoculars are constructed, the side mounting slots being substantially coplanar with the objective lens.

14. The binocular kit of claim 13, wherein:

the eyepiece blank additionally includes an elongate tab extending from each of the short sides of the eyepiece carrier between the side mountings;

the objective carrier additionally has two tab slots formed therein; and each elongate tab, bent generally perpendicularly relative to the objective carrier, is inserted into a respective one of the tab slots when the binoculars are constructed, the tab slots being substantially coplanar with the objective lens.

15. A flat-format binocular kit providing parts wherefrom binoculars are constructed, the binoculars constructed from the kit having a selectable magnification, the binocular kit comprising:

a corrugated blank, including a corrugated layer sandwiched between two outer layers, there being cut from the corrugated layer:
  a flat objective carrier having an objective aperture formed therein,
  a separate eyepiece blank,
  a first eyepiece carrier wherein a first eyepiece aperture is formed,
  a second eyepiece carrier wherein a second eyepiece aperture is formed, and
  means for disposing the objective carrier at a distance from, and substantially parallel to, the eyepiece blank;

means for attaching a selected one of the first eyepiece carrier and the second eyepiece carrier to the eyepiece blank;

an objective lens having a periphery, the objective lens being mounted in the objective aperture in the objective carrier with the periphery of the objective lens in contact with the corrugated layer;

a first eyepiece lens having a first focal length and a first periphery, the first eyepiece lens being mounted in the first eyepiece aperture with the first periphery facing the corrugated layer; and a second eyepiece lens having a second focal length, different from the first focal length, and a second periphery, the second eyepiece lens being mounted in the second eyepiece aperture with the second periphery facing the corrugated layer,
  the means for disposing the objective carrier at a distance from, and substantially parallel to, the eyepiece blank disposing the objective carrier at a settable distance from the eyepiece blank to form a focusable telescope from the objective lens and one of the first eyepiece lens and the second eyepiece lens.

16. A flat-format binocular kit providing parts wherefrom wearable binoculars are constructed, the binocular kit comprising:

a corrugated blank, including a corrugated layer sandwiched between two outer layers, there being cut from the corrugated layer:
  a flat objective carrier having two objective apertures and plural side mounting slots formed therein,
  a separate eyepiece blank, the eyepiece blank including:
    an eyepiece carrier having two eyepiece apertures formed therein, the eyepiece carrier having opposed short sides; and
    an elongate side mounting and an elongate tab extending from each of the short sides of the eyepiece carrier, and
  an elongate head band;

two objective lenses, each having a periphery, each of the objective lenses being mounted in a respective one of the objective apertures in the objective carrier with the periphery thereof in contact with the corrugated layer;

two eyepiece lenses, each having a periphery, each of the eyepiece lenses being mounted in a respective one the eyepiece apertures in the eyepiece carrier with the periphery thereof facing the corrugated layer,
  each of the objective lenses forming a focusable telescope with a respective one of the eyepiece lenses when the binoculars are constructed by bending each of the side mountings generally perpendicularly to the eyepiece carrier and by inserting each of the side mountings into a respective one of the side mounting slots in the objective carrier to dispose the objective carrier at a settable distance from the eyepiece carrier, the side mounting slots being substantially coplanar with the objective apertures; and means for attaching opposite ends of the head band to the elongate tabs following bending of the elongate tabs generally perpendicularly to the eyepiece carrier and away from the objective carrier when the binoculars are constructed.

17. A method of making wearable binoculars from a flat-format kit of parts, the method comprising steps of:

providing a flat-format kit of parts including:
  a corrugated blank having a corrugated layer sandwiched between two outer layers, there being cut from the corrugated blank:
    a flat objective carrier, the objective carrier having objective apertures formed therein;
    a separate flat eyepiece blank including:
      an eyepiece carrier having eyepiece apertures formed therein, the eyepiece carrier having opposed short sides, and
      an elongate tab extending from each of the short sides of the eyepiece carrier; and an elongate head band,
  objective lenses, each having a periphery and being mounted in a respective one of the objective apertures with the periphery thereof contacting the corrugated layer, and
  eyepiece lenses, each having a periphery and being mounted in a respective one of the eyepiece apertures with the periphery thereof facing the corrugated layer;

extracting the objective carrier from the corrugated blank;

extracting the eyepiece blank from the corrugated blank;

extracting the head band from the corrugated blank;

mounting the objective carrier on the eyepiece blank with the eyepiece lenses at a settable distance from the objective lenses to form a focusable telescope from each of the objective lenses and a respective one of the eyepiece lenses;

bending the elongate tabs generally perpendicularly relative to the eyepiece carrier and away from the objective carrier; and attaching opposite ends of the head band to the elongate tabs.

18. The method of claim 17, wherein:

in the step of providing a flat-format kit of parts:

the eyepiece carrier additionally has a long side,
the eyepiece blank additionally includes:
an elongate top mounting extending from the long side of the eyepiece carrier; and
an elongate side mounting extending from each of the short sides of the eyepiece carrier, and
the objective carrier additionally has a top mounting slot and plural side mounting slots formed therein, the top mounting slot and the side mounting slots being substantially coplanar with the objective lenses; and the mounting step comprises steps of:
bending the top mounting and each of the side mountings generally perpendicularly to the eyepiece carrier, and
inserting the top mounting into the top mounting slot, and inserting each of the side mountings into a respective one of the side mounting slots in the objective carrier.

19. The method of claim 18, additionally comprising a step of moving the objective carrier axially relative to the eyepiece carrier to adjust focus, the objective carrier sliding along the top mounting and the side mountings.

20. The method of claim 18, wherein:
in the step of providing a flat-format kit of parts, the objective carrier additionally has two tab slots formed therein; and
the method additionally comprises a step of converting the binoculars from wearable to hand-held, the step including steps of:
disconnecting each elongate tab from the head band,
bending each elongate tab through about two right angles towards the objective carrier, and
inserting each elongate tab into a respective one of the tab slots in the objective carrier, the tab slots being substantially coplanar with the objective lenses.

21. The method of claim 17, wherein:
in the step of providing a flat-format kit of parts, the objective carrier additionally has two tab slots formed therein; and
the method additionally comprises a step of converting the binoculars from wearable to hand-held, the step including steps of:
disconnecting the elongate tabs from the head band,
bending the elongate tabs through about two right angles towards the objective carrier, and
inserting each of the elongate tabs into a respective one of the tab slots in the objective carrier, the tab slots being substantially coplanar with the objective lenses.

22. The method of claim 17, wherein:
in the step of providing a flat-format kit of parts:
the eyepiece blank additionally includes a pair of elongate side mountings extending from each of the short sides of the eyepiece carrier, and
the objective carrier additionally has plural side mounting slots formed therein; and
the mounting step comprises steps of:
bending the side mountings generally perpendicularly relative to the eyepiece carrier, and
inserting each of the side mountings into a respective one of the side mounting slots in the objective carrier, the side mounting slots being substantially coplanar with the objective lenses.

23. The method of claim 22, wherein:
in the step of providing a flat-format kit of parts,
the objective carrier additionally has two tab slots formed therein; and
the method additionally comprises a step of converting the binoculars from wearable to hand-held, the step including steps of:
disconnecting each elongate tab from the head band,
bending each elongate tab through about two right angles towards the objective carrier, and
inserting each elongate tab into a respective one of the tab slots in the objective carrier, the tab slots being substantially coplanar with the objective lenses.

24. A method of making binoculars from a flat-format kit of parts, the method comprising steps of:
providing a flat-format kit of parts including:
a corrugated blank, having a corrugated layer sandwiched between two outer layers, there being cut from the corrugated blank:
a flat objective carrier, the objective carrier having objective apertures formed therein;
a separate flat eyepiece blank, including:
an eyepiece carrier having eyepiece apertures formed therein, the eyepiece carrier having opposed short sides, and
an elongate tab extending from each of the short sides of the eyepiece carrier; and
a backing sheet whereon the corrugated blank is attached,
objective lenses, each having a periphery, and being mounted in a respective one of the objective apertures with the periphery thereof contacting the corrugated layer, and
eyepiece lenses, each having a periphery, and being mounted in a respective one of the eyepiece apertures with the periphery thereof facing the corrugated layer;
separately extracting the objective carrier, and the eyepiece blank from the corrugated blank to form cavities in the corrugated blank, the cavities being bounded by the backing sheet;
mounting the objective carrier on the eyepiece blank with the eyepiece lenses at a settable distance from the objective lenses to form a focusable telescope from each of the objective lenses and a respective one of the eyepiece lenses;
dismounting the objective carrier from the eyepiece blank; and
returning the objective carrier and the eyepiece blank to the cavities in the corrugated blank wherefrom the objective carrier and the eyepiece blank were extracted in the extracting step.

25. The method of claim 24, wherein:
in the step of providing a flat-format kit of parts:
the eyepiece blank includes:
an eyepiece carrier wherein the eyepiece apertures are formed, the eyepiece carrier having a long side and opposed short sides;
an elongate top mounting extending from the long side of the eyepiece carrier; and
an elongate side mounting extending from each of the short sides of the eyepiece carrier, and
the objective carrier additionally has a top mounting slot and plural side mounting slots formed therein, the top mounting slot and the side mounting slots being substantially coplanar with the objective lenses; and
the mounting step comprises steps of:
bending the top mounting and each of the side mountings generally perpendicularly to the eyepiece carrier, and inserting the top mounting into the top mounting slot, and inserting each of the side mountings into a respective one of the side mounting slots in the objective carrier.

26. The method of claim 25, wherein:

in the step of providing a flat-format kit of parts:
the eyepiece blank additionally includes an elongate tab extending from each of the short sides of the eyepiece carrier, and
the objective carrier additionally has two tab slots formed therein; and the method additionally comprises steps of:
bending each elongate tab generally perpendicularly relative to the eyepiece carrier, and
inserting each elongate tab in a respective one of the tab slots in the objective carrier, the tab slots being substantially coplanar with the objective lenses.

27. The method of claim 24, wherein:

in the step of providing a flat-format kit of parts:
the eyepiece blank includes:
an eyepiece carrier wherein the eyepiece apertures are formed, the eyepiece carrier having opposed short sides; and
an elongate tab extending from each of the short sides of the eyepiece carrier, and
the objective carrier additionally has two tab slots formed therein; and the method additionally includes steps of:
bending each elongate tab generally perpendicularly relative to the eyepiece carrier, and
inserting each elongate tab in a respective one of the tab slots in the objective carrier, the tab slots being substantially coplanar with the objective lenses.

28. The method of claim 27, wherein:

in the step of providing a flat-format kit of parts, an elongate head band is additionally cut from the corrugated blank;

in the extracting step, the head band is additionally extracted from the corrugated blank; and the method additionally comprises a step of converting the binoculars from hand-held to wearable, the step including steps of:
disengaging the elongate tabs from the tab slots,
bending the elongate tabs through about two right angles towards the objective carrier, and
attaching opposite ends of the head band to the elongate tabs.

29. The method of claim 24, wherein:

in the step of providing a flat-format kit of parts:
the eyepiece blank includes:
an eyepiece carrier wherein the eyepiece apertures are formed, the eyepiece carrier having opposed short sides; and
a pair of elongate side mountings extending from each of the short sides of the eyepiece carrier, and
the objective carrier additionally has plural side mounting slots formed therein; and the mounting step comprises steps of:
bending the side mountings generally perpendicularly relative to the eyepiece carrier, and inserting each of the side mountings into a respective one of the side mounting slots in the objective carrier, the side mounting slots being substantially coplanar with the objective lenses.

30. The method of claim 29, wherein:

in the step of providing a flat-format kit of parts:
the eyepiece blank additionally includes an elongate tab extending from part of each of the short sides of the eyepiece carrier between the side mountings, and
the objective carrier additionally has two tab slots formed therein; and the method additionally comprises steps of:
bending each elongate tab generally perpendicularly relative to the eyepiece carrier, and
inserting each elongate tab into a respective one of the tab slots in the objective carrier, the tab slots being substantially coplanar with the objective lenses.

31. A method of making binoculars from a flat-format kit of parts, the binoculars having a selectable magnification, the method comprising steps of:

providing a flat-format kit of parts including:
a corrugated blank, having a corrugated layer sandwiched between two outer layers, there being cut from the corrugated blank:
a flat objective carrier, the objective carrier having objective apertures formed therein;
a separate flat eyepiece blank;
a first eyepiece carrier wherein first eyepiece apertures are formed; and
a second eyepiece carrier wherein second eyepiece apertures are formed,
objective lenses, each having a periphery and being mounted in a respective one of the objective apertures with the periphery thereof contacting the corrugated layer,
first eyepiece lenses, each having a periphery and a first focal length, each of the first eyepiece lenses being mounted in a respective one of the first eyepiece apertures in the first eyepiece carrier with the periphery thereof facing the corrugated layer, and
second eyepiece lenses having a second focal length, different from the first focal length, each of the second eyepiece lenses having a periphery, and being mounted in a respective one of the second eyepiece apertures in the second eyepiece carrier with the periphery thereof facing the corrugated layer;

extracting the objective carrier from the corrugated blank;

extracting the eyepiece blank from the corrugated blank;

attaching a selected one of the first eyepiece carrier and the second eyepiece carrier to the eyepiece blank to select the magnification; and mounting the objective carrier on the eyepiece blank with the eyepiece lenses at a settable distance from the objective lenses to form a focusable telescope from each of the objective lenses and a respective one of the eyepiece lenses.

* * * * *